United States Patent [19]
Conner et al.

[11] Patent Number: 5,622,417
[45] Date of Patent: Apr. 22, 1997

[54] INVERTIBLE AND ORTHOSCOPIC LIQUID CRYSTAL DISPLAY PROJECTOR

[75] Inventors: Arlie R. Conner, Tualatin; David K. Booth, Tigard, both of Oreg.

[73] Assignee: Lightware, Inc., Beaverton, Oreg.

[21] Appl. No.: 559,594

[22] Filed: Nov. 1, 1995

[51] Int. Cl.⁶ ................................................ G03B 21/14
[52] U.S. Cl. ........................... 353/69; 353/70; 353/102
[58] Field of Search ............................ 353/69, 70, 98, 353/99, 102

[56] References Cited

U.S. PATENT DOCUMENTS

| | | | |
|---|---|---|---|
| 4,002,408 | 1/1977 | Amma | 353/70 |
| 4,089,599 | 5/1978 | Kuboshima | 353/70 |
| 4,846,570 | 7/1989 | Kanai | 353/70 |
| 5,096,288 | 3/1992 | Yano et al. | 353/69 |
| 5,220,363 | 6/1993 | Sato et al. | 353/70 |
| 5,321,450 | 6/1994 | Shapiro et al. | 353/69 |
| 5,355,188 | 10/1994 | Biles et al. | 353/101 |

FOREIGN PATENT DOCUMENTS 0053425  4/1977  Japan ........................................ 353/70

*Primary Examiner*—William Dowling
*Attorney, Agent, or Firm*—Klarquist Sparkman Campbell Leigh & Whinston

[57] ABSTRACT

The present invention includes an invertible and orthoscopic LCD projector having a LCD panel for providing display information that is projected toward a display screen to form a display image. In a preferred embodiment, a converging Fresnel lens is positioned to receive the display information from the LCD panel and form a display object corresponding to the display image. The converging Fresnel lens has an optical center offset from the optical center of the LCD panel in an elevation direction and defines a projection optical axis that extends toward the display screen along an elevation angle in the elevation direction. The Fresnel lens is tilted automatically about a tilt axis transverse to the projection optical axis and the elevation direction by an amount proportional to the elevation angle to cooperate with the offset of the Fresnel lens optical center to form an orthoscopic display image.

14 Claims, 11 Drawing Sheets

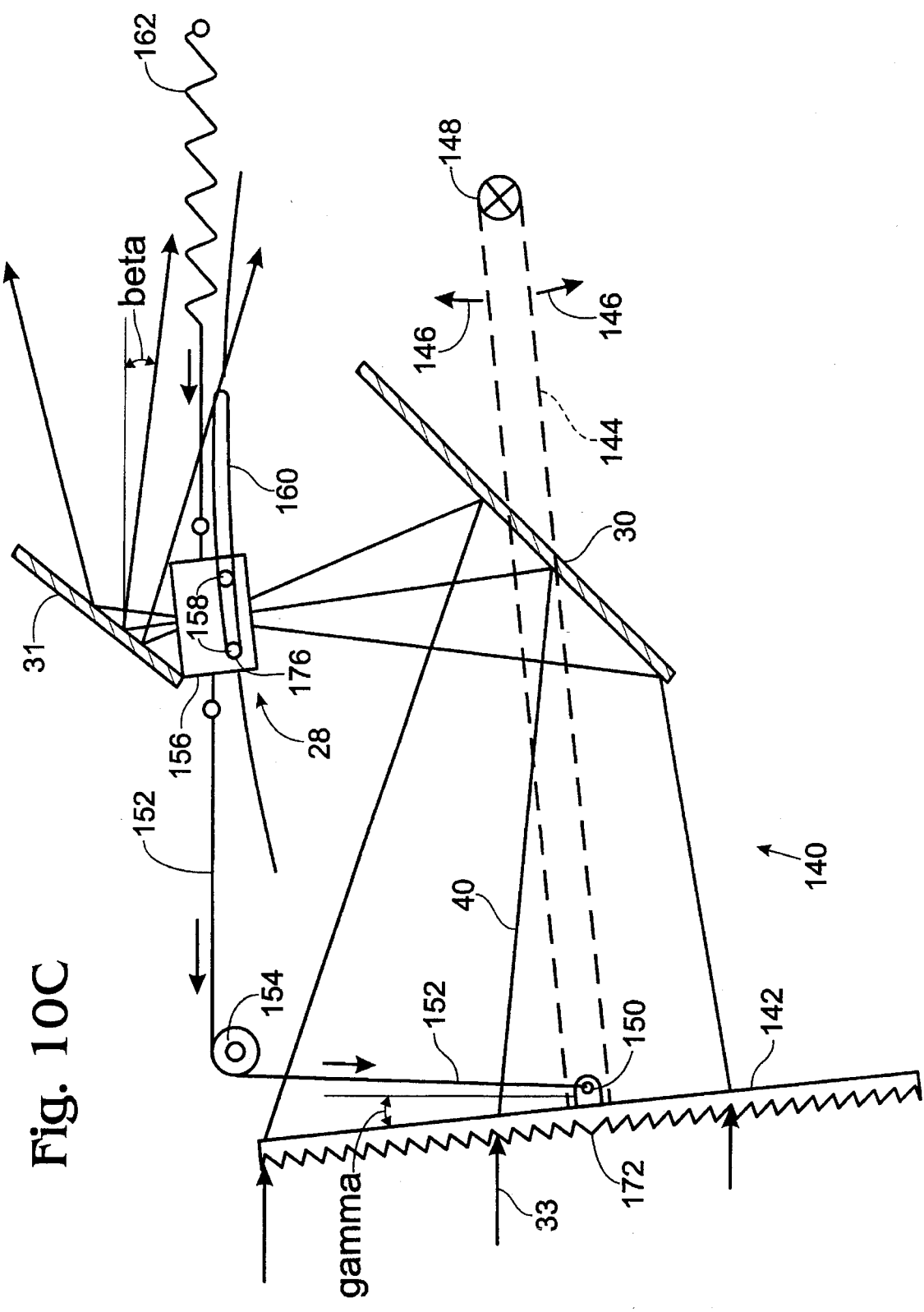

INVERTIBLE AND ORTHOSCOPIC LIQUID CRYSTAL DISPLAY PROJECTOR

FIELD OF THE INVENTION

The present invention relates to liquid crystal display projectors and, in particular, to such a projector that forms orthoscopic display images and is invertible for use in different mounting configurations.

BACKGROUND OF THE INVENTION

Image display projectors generate display images and project them onto display screens, typically for viewing by multiple persons or viewers. In a front-projection format, for example, the projector is positioned on the same side of the display screen as the viewers. The projector directs the display image to the display screen from which the image is reflected for viewing.

Some image display projectors, such as motion picture film projectors, typically are used in relatively large rooms, are positioned behind the viewers, and project the display image a relatively long distance to the display screen. Frequently, the display screen is positioned above the viewers and the projector directs the display images over the viewers at a relatively small downward elevation angle, which is defined as the angle of a central light ray from the projector relative to an axis that is normal or perpendicular to the center of the display screen. As a result of the relatively small elevation angle, the display image on the display screen appears generally rectangular and orthoscopic.

Other image display projectors, such as liquid crystal display (LCD) projectors, frequently rare used in relatively small rooms and are positioned relatively close to the display screen; either in front of or otherwise near the viewers. A LCD projector includes one or more transmissive liquid crystal displays as "light valves" that control light from an illumination system to form display images that are directed to the display screen by projection optics. Many color LCD projectors typically have one color LCD, such as an active matrix or passive matrix (e.g., super-twisted nematic (STN)) liquid crystal display, that controls red, green and blue spectral components of light to form a display image.

LCD projectors frequently are positioned on a table, cart, or other flat surface below the viewers' line-of-sight to the display screen. Alternatively, LCD projectors are sometimes mounted above the display screen (e.g., to a room ceiling) to direct the display image downwardly toward the display screen from above the viewers' line-of-sight.

A LCD projector directs the display image a relatively short distance to a display screen and, therefore, at relatively wide projection angles and at elevation angles of relatively large absolute value (e.g., greater than about 8 degrees typically, and as much as 25 degrees if it were physically possible). The absolute value of the elevation angles is referred to because LCD projectors mounted above and below a display screen would typically have negative and positive elevation angles, respectively. As a consequence of such a large elevation angle, the display image on the display screen appears trapezoidal and not orthoscopic. This is sometimes referred to as keystone distortion, which is generally unacceptable in many image display applications including motion pictures and computer displays.

Keystone distortion in LCD projectors typically is corrected by tilting certain optical components relative to the optical axis. One such system is described in U.S. Pat. No. 5,355,188 of Biles et al. fox Method and Apparatus for Distortion Correction in Optical Projectors. In this LCD projector, a Fresnel lens in the LCD projector is tilted to provide the projected display image with a differential magnification that offsets the keystone distortion. However, there is a limit to the degree that any lens may be tilted without causing image degradation due to the relatively poor imaging performance of lenses when used at steep off-axis angles. Another LCD projector in which keystone distortion is purportedly corrected by tilting certain optical components is described in U.S. Pat. No. 5,321,450 of Shapiro et al.

A limitation of such corrections for keystone distortion is that the corrections are suited primarily for a single elevation angle between the LCD projector and the display screen. However, LCD projectors frequently are used under different circumstances resulting in different elevation angles.

More specifically, it is frequently necessary to adjust the picture height or projector elevation angle to reach a fixed (e.g., permanent) display screen or to adjust the height of the image for best unobstructed and comfortable viewing. Nearly all LCD projectors have elevation-adjusting legs or feet for this purpose. A conventional LCD projector with an elevation angle greater than the keystone-corrected angle will form a display image with "positive" keystone distortion (i.e., the top of the image is wider than the bottom). A conventional LCD projector with an elevation angle less than the keystone-corrected angle will form a display image with "negative" keystone distortion (i.e., the top of the image is narrower than the bottom).

SUMMARY OF THE INVENTION

An object of the present invention is, therefore, to provide an LCD projector that forms orthoscopic display images over a range of elevation angles.

Another object of this invention is to provide such a LCD projector that is invertible for selectively projecting display images upwardly or downwardly toward a display screen.

A further object of this invention is to provide such a LCD projector that forms orthoscopic display images automatically over a range of projector elevation angles.

The present invention includes an invertible and orthoscopic LCD projector having a liquid crystal display (LCD) for providing display information that is projected toward a display screen to form a display image. A light source illuminates the LCD, which has an optical center substantially aligned with an illumination optical axis extending toward the light source. A collimating Fresnel lens collimates the light passing to the LCD, and a lens combination cooperates to form and project a display image toward a display screen. The display image is projected at an elevation angle in an elevation direction toward the display screen.

In a preferred embodiment, the lens combination includes a converging field lens (e.g., a Fresnel lens) positioned to receive the display information from the LCD and form a display object corresponding to the display image. The Fresnel field lens has an optical center offset from the optical center of the LCD parallel to the elevation direction and defines a projection optical axis that extends toward the display screen along an elevation angle in the elevation direction. In addition, the Fresnel field lens is tilted about a tilt axis transverse to the projection optical axis and the elevation direction to cooperate with the offset of the Fresnel field lens optical center to form an orthoscopic display image. To provide orthoscopic display images over a range of elevation angles, the Fresnel field lens is pivotable automatically about the tilt axis with variations in the elevation angle. In an alternative embodiment, the Fresnel field lens also shifts transversely automatically with variations in the elevation angle.

Another aspect of the preferred embodiment of this invention is that the LCD projector provides orthoscopic display images whether mounted conventionally or in an inverted orientation (e.g., from a room ceiling). Moreover, the LCD projector forms the display images with an erect (i.e., upright) orientation whether mounted in a conventional or inverted orientation. By providing erect, orthoscopic display images for different mounting orientations, the LCD projector of this invention eliminates the need for different manufacturing or installation adjustments according to the installed orientation, thereby reducing manufacturing and installation costs for such projectors.

Moreover, the LCD projector of this invention preferably provides such erect display images without a top-to-bottom inverting frame buffer circuit. Inverting the orientation of a conventional LCD projector causes a top-to-bottom inversion of the display image. An inverting frame buffer circuit typically would be used to correct the orientation of the display image.

An LCD projector of this invention includes a projection mirror angled to receive light carrying display information and to redirect the light toward the display screen. The projection mirror is positionable to direct the light in either of two opposed directions to provide erect display images for respective conventional and inverted orientations of the LCD projector.

The foregoing and other features and advantages of preferred embodiments of the present invention will be more readily apparent from the following detailed description, which proceeds with reference to the accompanying drawings.

BRIEF DESCRIPTION OF THE DRAWINGS

FIGS. 10A–10C are diagrammatic side views of another alternative automatic keystone correction mechanism shown in a conventional arrangement shown with different projection angles and keystone distortion corrections.

DETAILED DESCRIPTION OF PREFERRED EMBODIMENTS

Figure 1:
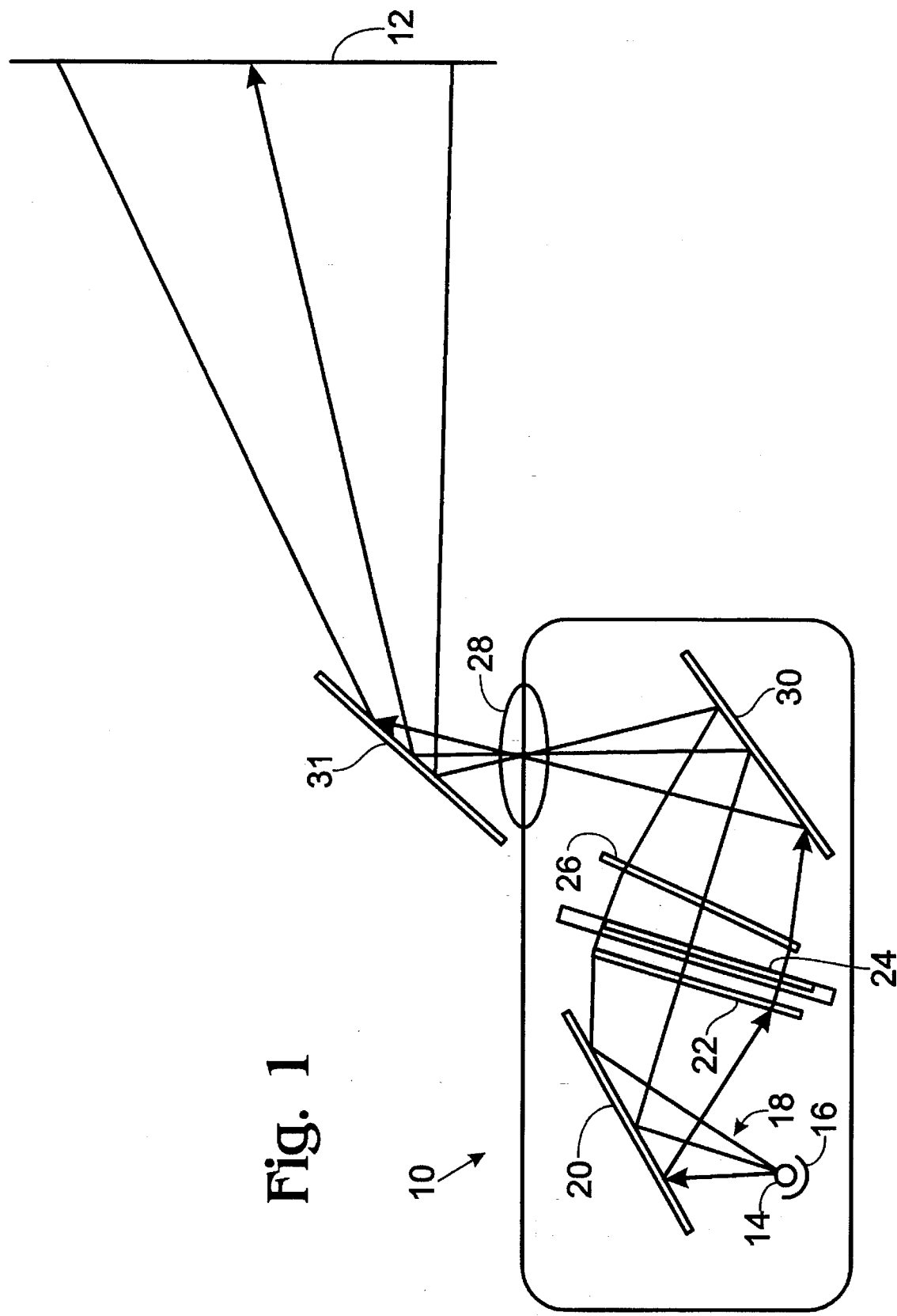
FIG. 1 is a schematic side view optical diagram of an invertible and orthoscopic LCD projector of the present invention oriented and configured for upward projection toward a display screen.

FIG. 1 is a schematic side view optical diagram of an invertible and orthoscopic LCD projector 10 of the present invention in a conventional table-mounted orientation to project display images upward toward a display screen 12. LCD projector 10 includes a conventional light source 14 and reflector 16 that direct polychromatic, substantially white light along optical paths 18 toward a first fold mirror 20.

The light passes through a collimating lens 22 that collimates the light for delivery to a LCD 24 such as, for example, a transmissive color thin-film transistor (TFT) active matrix LCD with a diagonal dimension of between 12 and 25 cm and any required polarizing elements, such as is available from Sharp Corporation of Osaka, Japan. For LCD 24 of the preferred dimensions, collimating lens 22 preferably is a collimating Fresnel lens for reducing costs. For a smaller LCD 24 with comparable image display resolution, a conventional optical lens is preferred to avoid image artifacts that can arise if a Fresnel lens is used in higher resolution optical systems.

As is known in the art, LCD 24 controls or modulates the substantially white light to form a multi- or full-color display object according to a video display signal delivered to LCD 24 from display control circuitry (not shown). The video display signal may be in the form of, for example, a computer display signal that is generated in real-time or retrieved from a computer memory or a television signal obtained from a broadcast or a video recording medium.

The light modulated by LCD 24 propagates to a converging field lens 26 that focuses the light toward a conventional objective projection lens assembly 28. Projection lens assembly 28 is preferably in the form of a varifocal lens. As with collimating lens 22, converging lens 26 preferably is a converging Fresnel lens but could alternatively be a conventional optical lens. A front-surface fold mirror 30 folds the light from converging Fresnel lens 26 to pass substantially vertically through projection lens assembly 28. A projection mirror 31 receives the light from projection lens assembly 28 and directs the light toward display screen 12 to form a display image.

Figure 2:
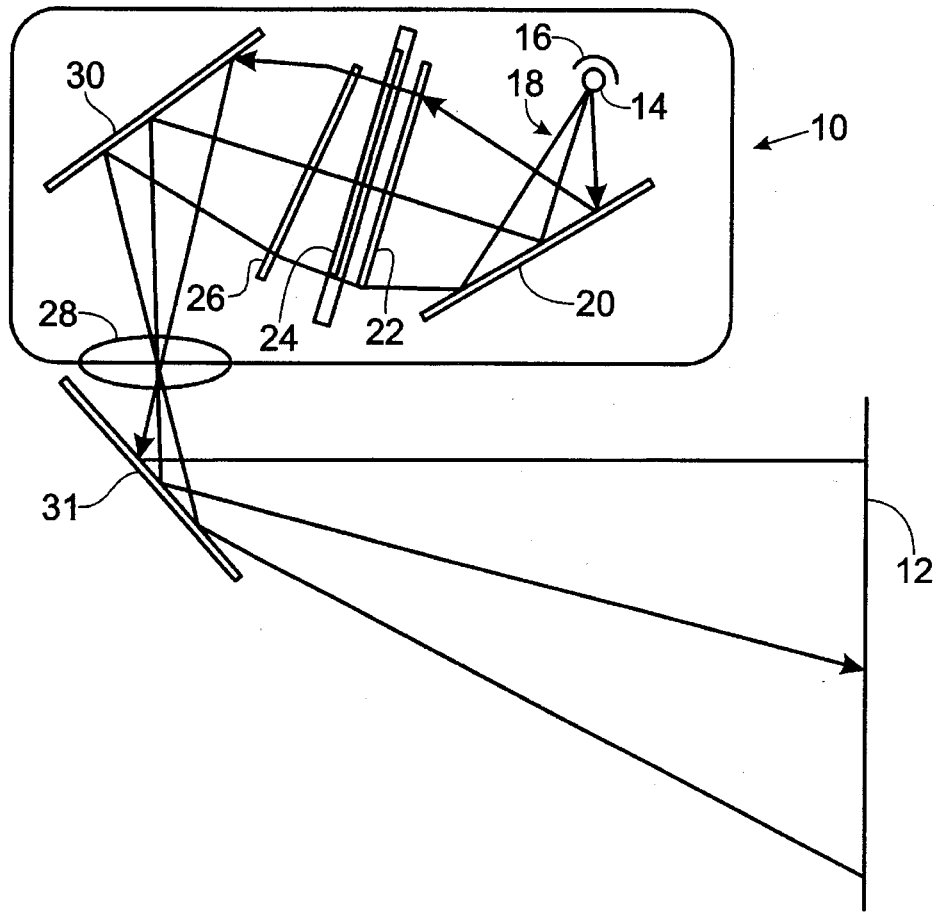
FIG. 2 is a schematic side view optical diagram of the invertible and orthoscopic LCD projector of the present invention oriented and configured for downward projection toward a display screen.

FIG. 2 is a schematic side view optical diagram of invertible and orthoscopic LCD projector 10 in an inverted ceiling-mounted orientation to project display images downward toward a display screen 12 by reversing the tilt of projection mirror 31. The tilt of projection mirror 31 is reversed in that it directs the light in a direction generally opposite the direction light is directed in the conventional table-mounted orientation of projector 10.

Reversing the tilt of projection mirror 31 provides erect display images for respective conventional and inverted orientations of the LCD projector. It will be appreciated that the tilt of projection mirror 31 can be reversed in any number of ways according to the manner in which projection mirror 31 is mounted to LCD projector 10. As examples, the tilt of projection mirror 31 can be reversed by tilting it about its tilt axis, pivoting projection mirror 31 about a vertical axis aligned with a central optical axis through projection lens assembly 28, or even dismounting a bracket supporting projection mirror 31 and secured (e.g., with screws) to LCD projector 10 and remounting the bracket with projection mirror 31 in the reverse tilt orientation.

An aspect of this invention is that LCD projector 10 shown in FIGS. 1 and 2 provides display images that are orthoscopic (i.e., keystone distortion is corrected) and erect (i.e., upright) whether LCD projector 10 is oriented to project display images upwardly or downwardly toward display screen 12. Orthoscopic display images are provided by conventional LCD projectors in a manner that is suited either for upward or downward projection, but that exaggerates the distortion for projection of the other type. Erect display images in conventional LCD projectors are obtained in inverted (typically, downwardly projected) arrangements by an inverting frame buffer memory, which are complex and costly.

Figure 3:
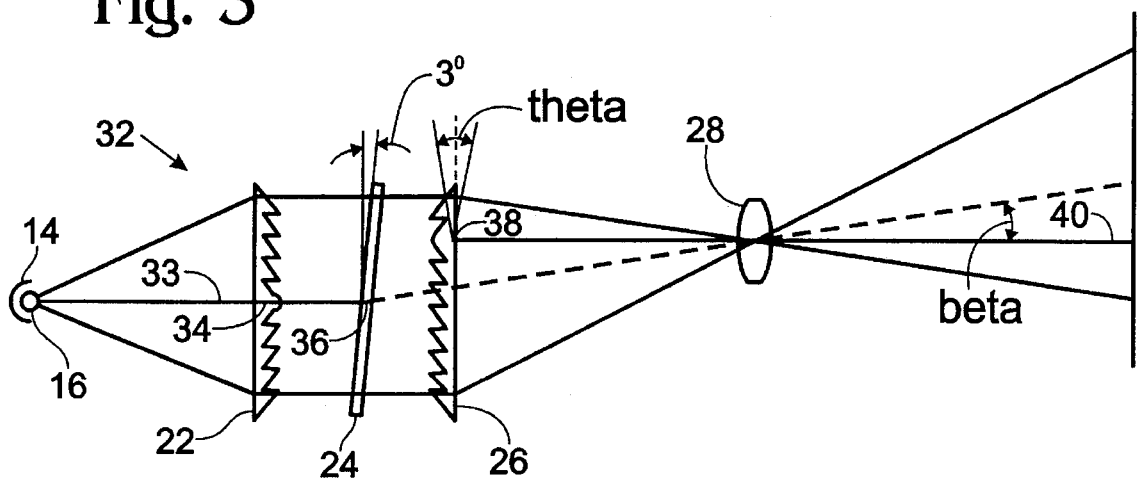
FIG. 3 is a schematic side view optical diagram of optical components of the LCD projector of FIGS. 1 and 2 arranged along a straight-line optical path as an alternative embodiment and for purposes of illustration.

FIG. 3 is a schematic side view optical diagram of the optical components of an LCD projector 32 arranged along a straight-line optical path. This straight-line optical path represents an alternative embodiment of the LCD projector of the present invention and illustrates an aspect of the keystone distortion correction of the present invention. The optical components of LCD projector 32 are the same as those of LCD projector 10, except that with the straight-line optical path LCD projector 32 does not include the mirrors 20, 30, and 31 of LCD projector 10.

Light source 14 and reflector 16 define an initial central optical axis 33. Collimating Fresnel lens 22 is formed with an optical center 34 that is substantially in the center of Fresnel lens 22 and aligned with optical axis 33. Similarly, LCD 24 has a physical center 36 that is substantially aligned with optical axis 33. Such an alignment of optical components is common in LCD projectors. Preferably, LCD 24 is tilted about +3 degrees relative to a normal orientation to optical axis 33 to enhance the image contrast.

Fresnel field lens 26 is formed to have an optical center 38 that is offset vertically relative to the physical center of Fresnel field lens 26 and centers 34 and 36 of collimating Fresnel lens 22 and LCD 24, respectively. A conventional Fresnel lens, such as Fresnel lens 22, has multiple concentric circular grooves centered and extending symmetrically about optical center 38. Fresnel field lens 26 also has multiple concentric circular grooves centered about optical center 38. Accordingly, persons skilled in the art of Fresnel lens design and manufacture will understand the design and manufacture of Fresnel field lens 26.

Due to the offset position of its optical center 38, Fresnel field lens 26 defines a subsequent undeviated optical axis ray 40 that is correspondingly offset from initial optical axis 33. Preferably, the offset between optical axes 33 and 40 is between 10 and 120 percent, and preferably about 45 percent, of the half-height 42 of LCD 24. Such an offset provides an effective elevation angle beta of between about 5 and 15 degrees, and preferably about 6 degrees.

Offsetting an optical element such as a Fresnel lens to provide an elevation angle is known in the art. Also known in the art, however, is that the performance of such lenses is degraded at wider field angles and eventually becomes unworkable (i.e., degraded in performance beyond acceptance or to an extent that is correctable, but only at unacceptable expense). As a consequence, the maximum acceptable elevation angle obtainable by offsetting optical center 38 of Fresnel field lens 26 is about 10 degrees. Such a maximum elevation angle is inadequate for LCD projectors that are used in relatively small rooms such as, for example, small meeting rooms or residences.

An aspect of this invention is that converging Fresnel lens 26 is also tilted about its optical center 34 to provide the projected display image with a differential magnification that offsets the keystone distortion. Converging Fresnel lens 26 is tilted at an angle theta of no more than ± 15 degrees, and preferably no more than ± 8 degrees normal or perpendicular to display screen 12. Such small tilt angles prevent image degradation due to the relatively poor imaging performance characteristic of Fresnel lenses.

Preferably, the tilt angle of converging Fresnel lens 26 is variable over a 12 degree range (e.g. 0–12 degrees) according to the angle of optical axis 40 relative to a normal from display screen 12. Such a range of variability, together with the preferred offset of optical center 34 of converging Fresnel lens 26, would provide a LCD projector of the present invention with keystone distortion correction over a range of effective elevation angles of 0 to 25 degrees, preferably 6 to 18 degrees.

It will be appreciated that the offset between optical axes 33 and 40 and range of tilt angles for converging Fresnel lens 26 cooperate with the dimensions of LCD 24 to provide a selected range of effective elevation angles. The range of elevation angles is selected according to the anticipated primary use of LCD projector 10, preferably relatively near display screen 12 and at relatively large projection angles. The combination of offsetting optical axes 33 and 40 and tilting converging Fresnel lens 26 provides a balanced correction of keystone distortion that is effective under such relatively difficult constraints.

Figure 4:
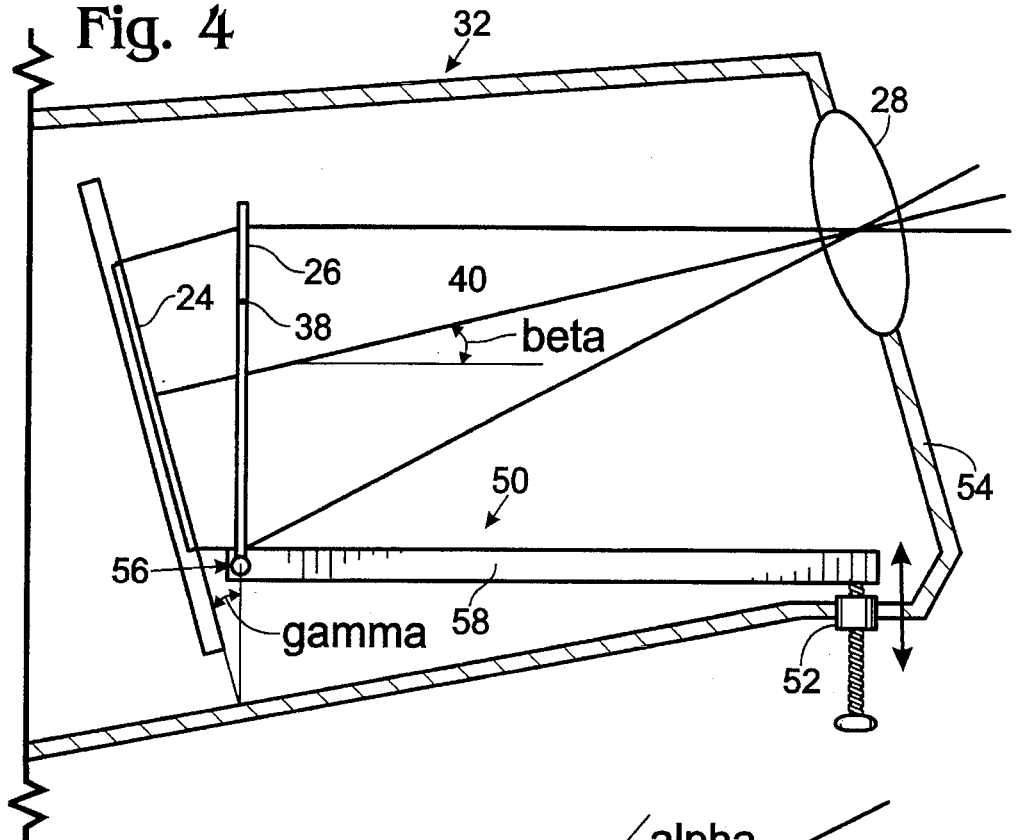
FIG. 4 is a diagrammatic side view of an embodiment of an automatic keystone distortion correction mechanism employed in an LCD projector with a straight-line optical path as shown in FIG. 3.

FIG. 4 is a diagrammatic side view of an embodiment of an automatic keystone distortion correction mechanism 50 employed in LCD projector 32 with a straight-line optical path as shown in FIG. 3. Correction mechanism 50 causes Fresnel field lens 26 to tilt relative to optical axis 40 in agreement with any adjustment of the elevation angle of LCD projector 32 with an elevator foot mechanism 52 mounted to a projector case 54 (shown in part diagrammatically) that is pivotable on rear case feet (not shown). For purposes of brevity, the following description refers to various mechanisms or components engaging or cooperating with converging Fresnel lens 26 and other optical components. It will be appreciated that such mechanisms or components would in practice engage a bracket or frame supporting these optical components.

Fresnel field lens 26 is pivotally mounted within projector case 54 by a hinge mechanism 56 preferably positioned in line with optical center 38. A lower end of converging Fresnel lens 26 is coupled to one end of a Fresnel tilt arm 58, the other end of which is pivotally coupled to elevator foot mechanism 52. Elevator foot mechanism 52 may include a ratchet or other commonly available mechanism for securing projector case 54 at different heights to form different elevation angles.

Varying the height of projector case 54 with elevator foot mechanism 52 causes Fresnel tilt arm 58 to pivot converging Fresnel lens 26 about its hinge mechanism 56. Preferably, the length of Fresnel tilt arm 58, the height variability of elevator foot mechanism 52, and the distance between hinge mechanism 56 and the pivotal coupling between Fresnel tilt arm 58 and Fresnel lens 26 are selected so that each degree of change in an elevation angle beta of optical axis 40 provided by elevator foot mechanism 52 provides a corresponding degree of change in a tilt angle gamma of converging Fresnel lens 26.

Figure 5:
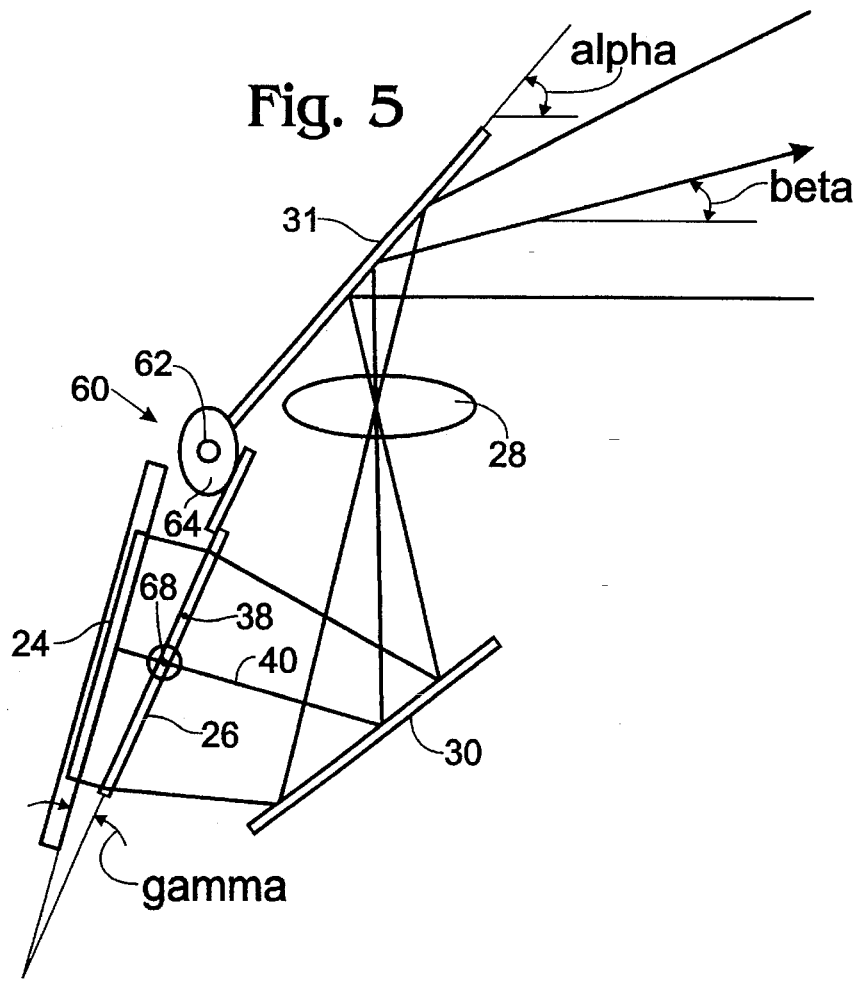
FIG. 5 is a diagrammatic side view of a simplified embodiment of an automatic keystone distortion correction mechanism employed in the LCD projector of FIGS. 1 and 2.

FIG. 5 is a diagrammatic side view of a simplified embodiment of an automatic keystone distortion correction mechanism 60 employed in LCD projector 10 with a folded optical path as shown in FIGS. 1 and 2. Correction mechanism 60 causes converging Fresnel lens 26 to tilt relative to optical axis 40 in agreement with any adjustment of the elevation angle of LCD projector 10 with tiltable projection mirror 31. Although described with reference to a table-mounted upwardly projecting arrangement, correction mechanism is similarly applicable to a ceiling-mounted downwardly projecting arrangement.

Projection mirror 31 is tiltable about a pivot axis 62 to adjust the elevation angle of LCD projector 10. An inner end of projection mirror 31 is pivotally coupled to an eccentric cam 64 that pivots about a pivot axis 62 whenever projection mirror 31 is tilted. Converging Fresnel lens 26 is pivotally mounted within LCD projector 10 by a hinge mechanism 68 preferably positioned in line with the central projection axis through Fresnel lens 26. One margin of converging Fresnel lens 26 engages eccentric cam 64 under a light tension provided by a spring (not shown).

Varying the tilt of projection mirror 31 causes eccentric cam 64 to pivot relative to converging Fresnel lens 26. With the light tension against eccentric cam 64, converging Fresnel lens 26 pivots about its hinge mechanism 68. Each degree of change in tilt angle alpha of projection mirror 31 provides a corresponding two degrees of change in elevation angle beta of optical axis 40. As with correction mechanism 50, each degree of change in elevation angle beta of optical axis 40 preferably provides a corresponding one degree of change in tilt angle gamma of converging Fresnel lens 26. Accordingly, the size and eccentricity of eccentric cam 64 and the distance between it and hinge mechanism 68 are selected so that each degree of change in elevation angle beta of projection axis 40 provides a corresponding one degree of change in tilt angle gamma of converging Fresnel lens 26.

One advantage of the automatic variable keystone distortion correction of this invention is that keystone distortion is corrected according to the elevation angle. Previous keystone distortion correction arrangements were optimized only for a single elevation angle and therefore allowed keystone distortion at other elevation angles.

Another advantage of this invention is the ease of installing LCD projectors. For a LCD projector mounted to a ceiling, for example, tilting projection mirror 31 to adjust the location where display images are directed automatically provides a orthoscopic display image as a result of the automatic keystone distortion correction.

Figure 6A:
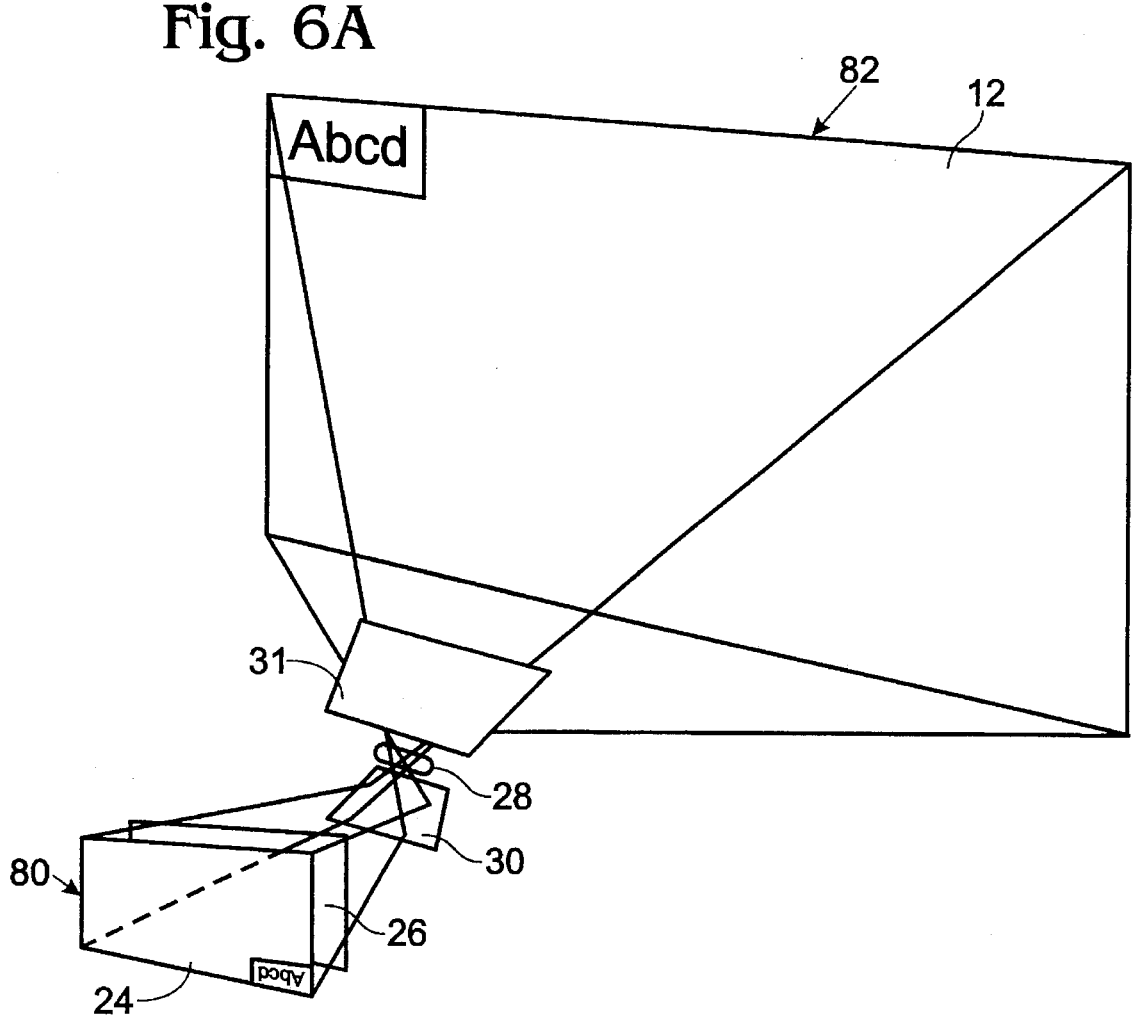
FIGS. 6A and 6B are schematic perspective and side view diagrams, respectively, showing the relationship between a display object and a display image for the LCD projector with the upward projection of FIG. 1.
Figure 6B:
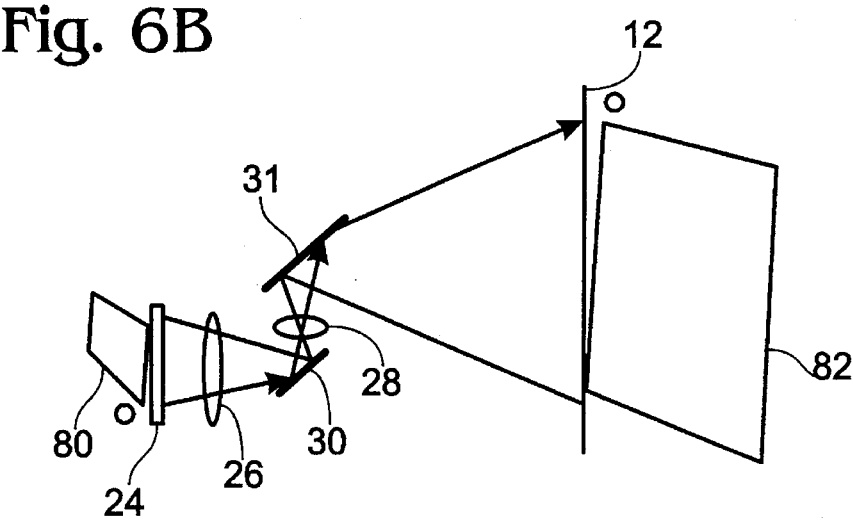

FIGS. 6A and 6B are schematic perspective and side view diagrams, respectively, showing the relationship between display object 80 generated by LCD 24 and resulting display image 82 formed on display screen 12 by LCD projector 10 with the upward projection of FIG. 1. The optical components of LCD projector 10 shown in FIGS. 6A and 6B are LCD 24, converging Fresnel field lens 26, projection lens 28, fold mirror 30, and projection mirror 31, which cooperate to invert display object 80 left-to-right and top-to-bottom to form display image 82.

FIG. 6A shows that the optical components of LCD projector 10 cooperate to invert display object 80 in forming display image 82. The generally parallel arrangement of mirrors 30 and 31 causes the top-to-bottom inversion of display object 80 by lenses 26 and 28 to be carried through to display image 82. Mirrors 30 and 31 have no effect on the left-to-right inversion of display object 80 by lenses 26 and 28.

Figure 7A:
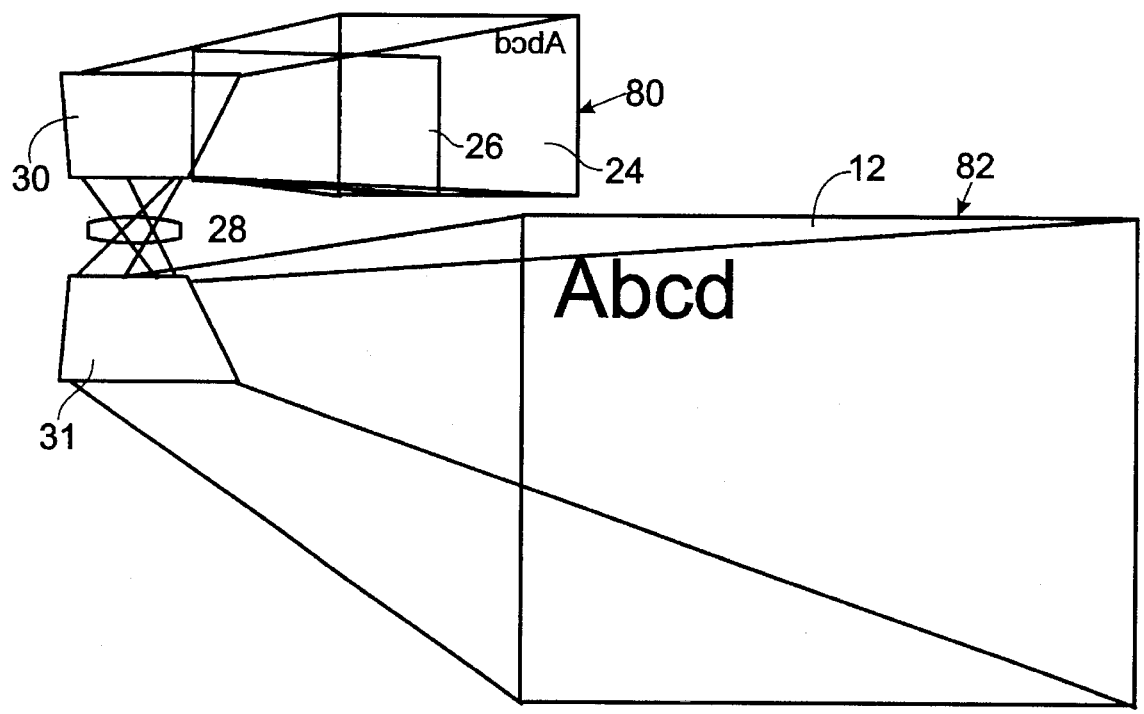
FIGS. 7A and 7B are schematic perspective and side view diagrams, respectively, showing the relationship between a display object and a display image for the LCD projector with the upward projection of FIG. 3.
Figure 7B:
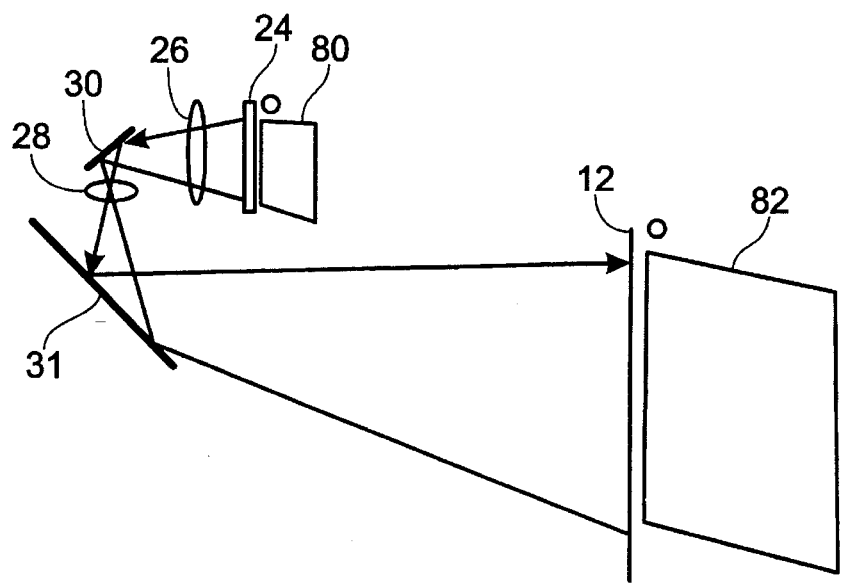

FIGS. 7A and 7B are schematic perspective and side view diagrams, respectively, showing the relationship between display object 80 generated by LCD 24 and resulting display image 82 formed on display screen 12 by LCD projector 10 with the downward projection of FIG. 2. The optical components of LCD projector 10 shown in FIGS. 7A and 7B are the same as those of LCD projector 10 shown in FIGS. 6A and 6B, except that the tilt of projection mirror 31 is reversed. The optical components of LCD projector 10 cooperate to form display image 82 as a left-to-right, but not top-to-bottom, inversion of display object 80.

FIG. 7A shows that the optical components of LCD projector 10 cooperate to invert display object 80 left-to-right, but not top-to-bottom, in forming display image 82. The generally perpendicular arrangement of mirrors 30 and 31 causes the top-to-bottom inversion of display object 80 by lenses 26 and 28 to be inverted again to form display image 82 without top-to-bottom inversion relative to LCD 24. Mirrors 30 and 31 have no effect on the left-to-right inversion of display object 80 by lenses 26 and 28.

A result of the selective top-to-bottom inversion of display object 80 according to the tilt direction of projection mirror 31 is that LCD projector 10 of this invention forms correctly oriented display images 82 whether mounted for upward or downward projection. Moreover, the automatic variable keystone distortion correction of this invention provides orthoscopic display images 82 for both upward and down projection orientations. As a result, LCD projector 10 can automatically provide correctly oriented, orthoscopic display images 82 for upward and downward projection orientations with no change other than the tilt direction of projection mirror 31. This automatic capability simplifies installation of LCD projector 10 in either orientation and reduces manufacturing costs by allowing a single design to be used for upward and downward projection orientations.

Figure 8:
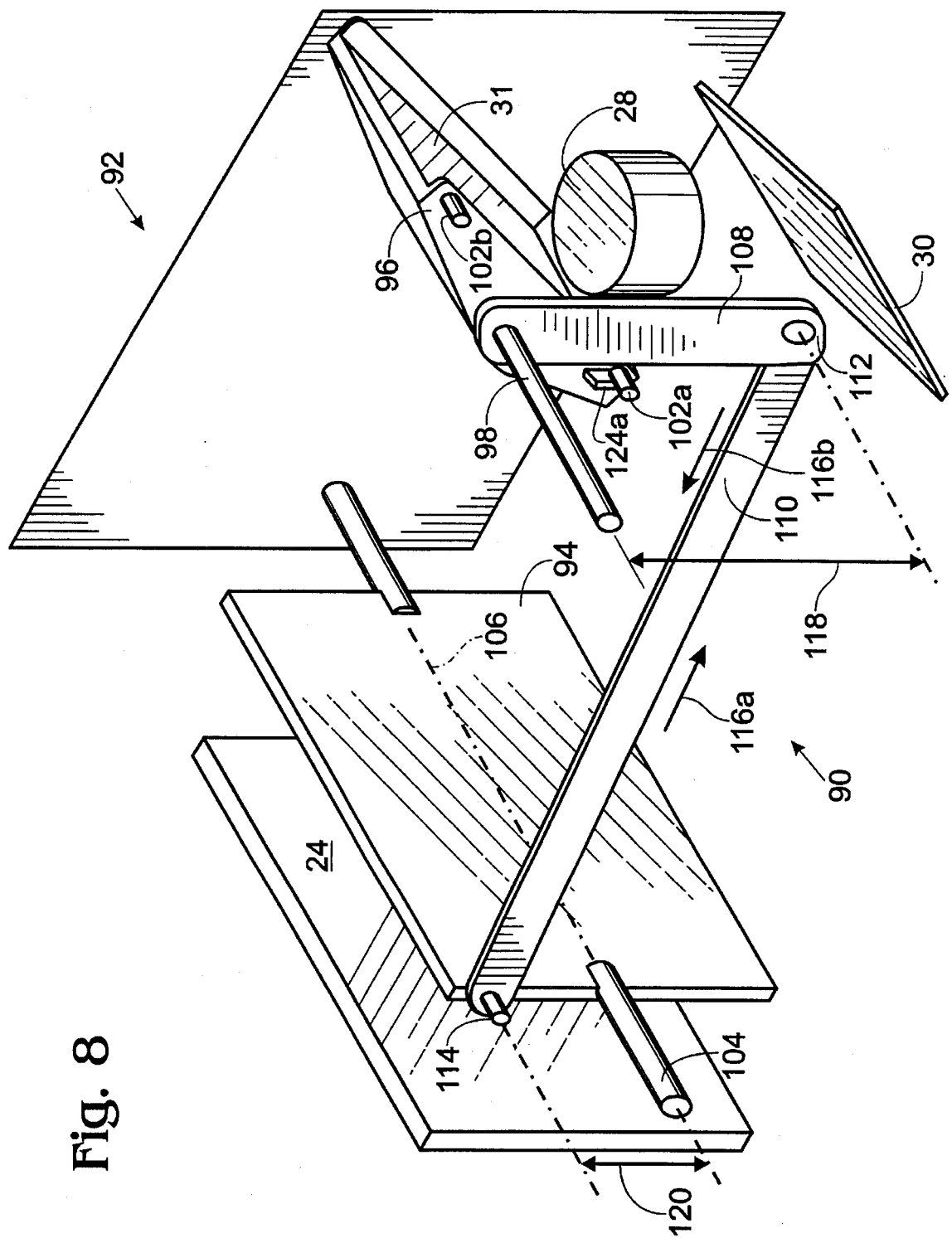
FIG. 8 is a diagrammatic isometric side view of an alternative automatic keystone distortion correction mechanism in a conventional arrangement.

FIG. 8 is a diagrammatic isometric side view of another embodiment of an automatic keystone distortion correction mechanism 90 employed in a LCD projector 92 (partly shown) with a folded optical path and optical components such as those of LCD projector 10, except as indicated otherwise. Correction mechanism 90 causes a converging Fresnel field lens 94 to tilt relative to optical axis 40 (FIG. 9A) in agreement with any adjustment of the elevation angle of LCD projector 92 with tiltable projection mirror 31. FIG. 8 shows automatic keystone distortion correction mechanism 90 with reference to a conventional table-mounted upwardly projecting arrangement, but is similarly applicable to an inverted ceiling-mounted, but is similarly applicable to downwardly projecting arrangement, as described below in greater detail.

Projection mirror 31 is carried within a mirror housing 96 that is tiltable about a fixed pivot axis 98 to adjust the elevation angle of LCD projector 92. Mirror housing 96 includes a pair of contact arms 102a and 102b that extend from housing 96 in a direction generally parallel to pivot axis 98. Converging Fresnel field lens 94 is pivotally mounted within LCD projector 92 by a hinge mechanism 104 preferably positioned in line with optical center 106 of Fresnel field lens 94.

In the table-mounted upwardly projecting arrangement, contact arm 102a of mirror housing 96 engages a lever arm 108 at an upward preselected tilt angle alpha (e.g., about 45 degrees). Lever arm 108 is connected to mirror housing 96 at pivot axis 98, and a push rod link 110 is linearly coupled with pivotal links between an end 112 of lever arm 108 and a pivot coupling 114 on a side margin of a bracket (not shown) supporting Fresnel field lens 94.

In the table-mounted upwardly projecting orientation of FIG. 8, projection mirror 31 is tilted at an upward preselected tilt angle alpha (e.g., about 45 degrees). The preselected tilt angle alpha represents a minimum upward projection angle for projector 92. At higher tilt angles, contact arm 102a engages lever arm 108 and pivots it about pivot axis 98 to correct automatically keystone distortion.

As a result, end 112 of lever arm 108 moves push rod link 110 linearly against pivot coupling 114 of Fresnel field lens 94 to move it in a direction 116a and tilt Fresnel field lens 94. With pivot axis 98 a distance 118 from push rod link 110 of about twice the distance 120 between hinge mechanism 104 and pivot coupling 114, mechanism 90 automatically corrects keystone distortion for tilt angles greater than the preselected tilt angle alpha.

Automatic keystone distortion correction mechanism 90 also can be adapted to correct keystone distortion at lower tilt angles that would arise, for example, whenever projector 92 in the table-mounted configuration to project display images downwardly (e.g., projector 92 is mounted above the display screen). An optional magnet 124a secured to contact arm 102a magnetically couples lever arm 108, which is formed of a magnetically responsive material.

At tilt angles less that the preselected tilt angle alpha, magnet 124a magnetically couples lever arm 108 and pivots it about pivot axis 98. Lever arm 108 moves push rod link 110 linearly from pivot coupling 114 of Fresnel field lens 94 to move it in a direction 116b and tilt Fresnel field lens 94. Optional magnet 124a is functional to provide automatic keystone distortion correction for a predefined range of downward tilt angles according to the relative strength of magnet 124a and the mobility of lever arm 108 about pivot axis 98. Magnet 124a simply decouples from lever arm 108 at tilt angles greater than the predefined range of downward tilt angles. For example, magnet 124a decouples from lever arm 108 whenever projection mirror 31 is reoriented for use in an inverted configuration.

Figure 9A:
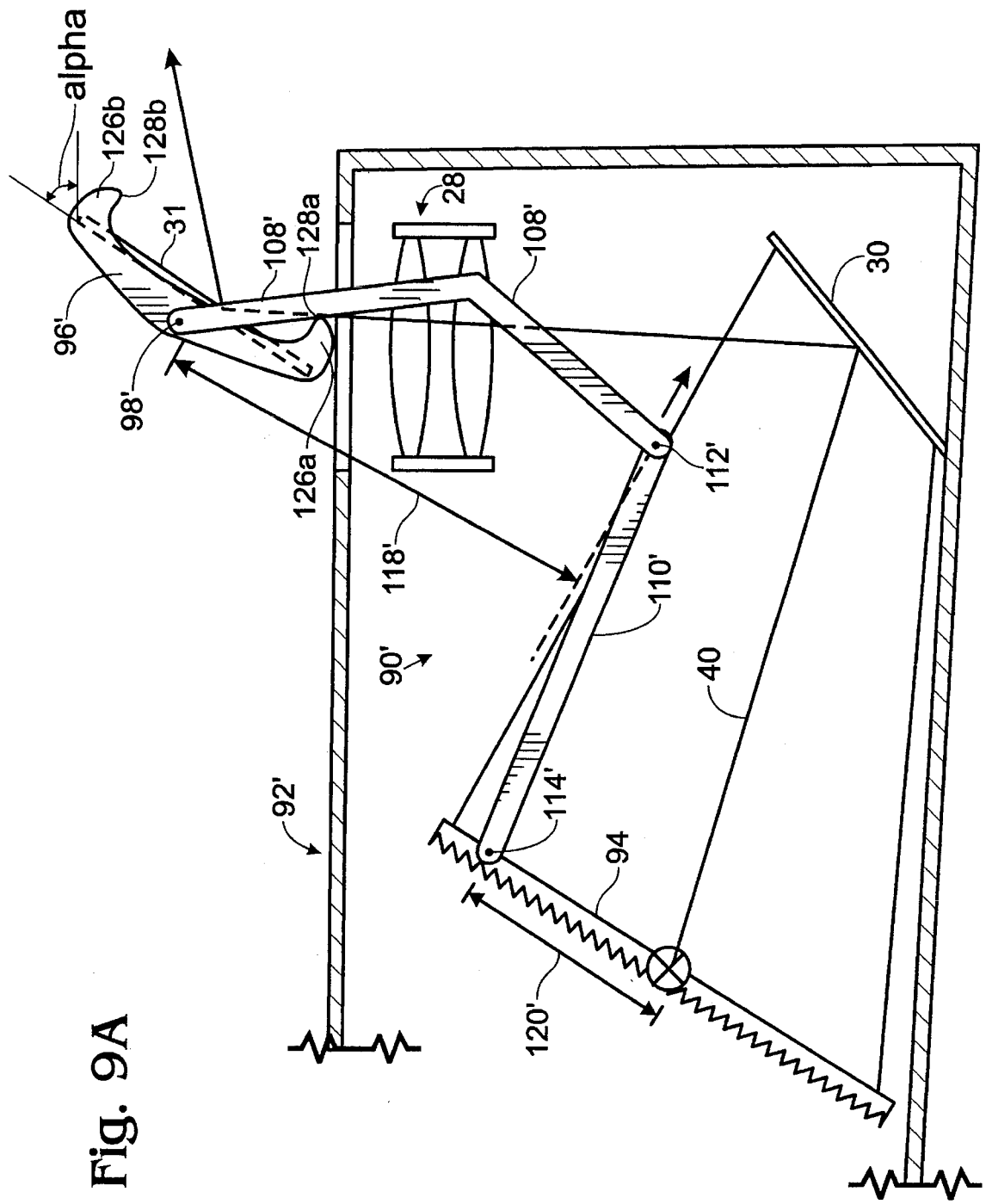
FIGS. 9A and 9B are diagrammatic side views of an alternative automatic keystone distortion correction mechanism of the type of FIG. 8 shown in conventional and inverted arrangements, respectively.
Figure 9B:
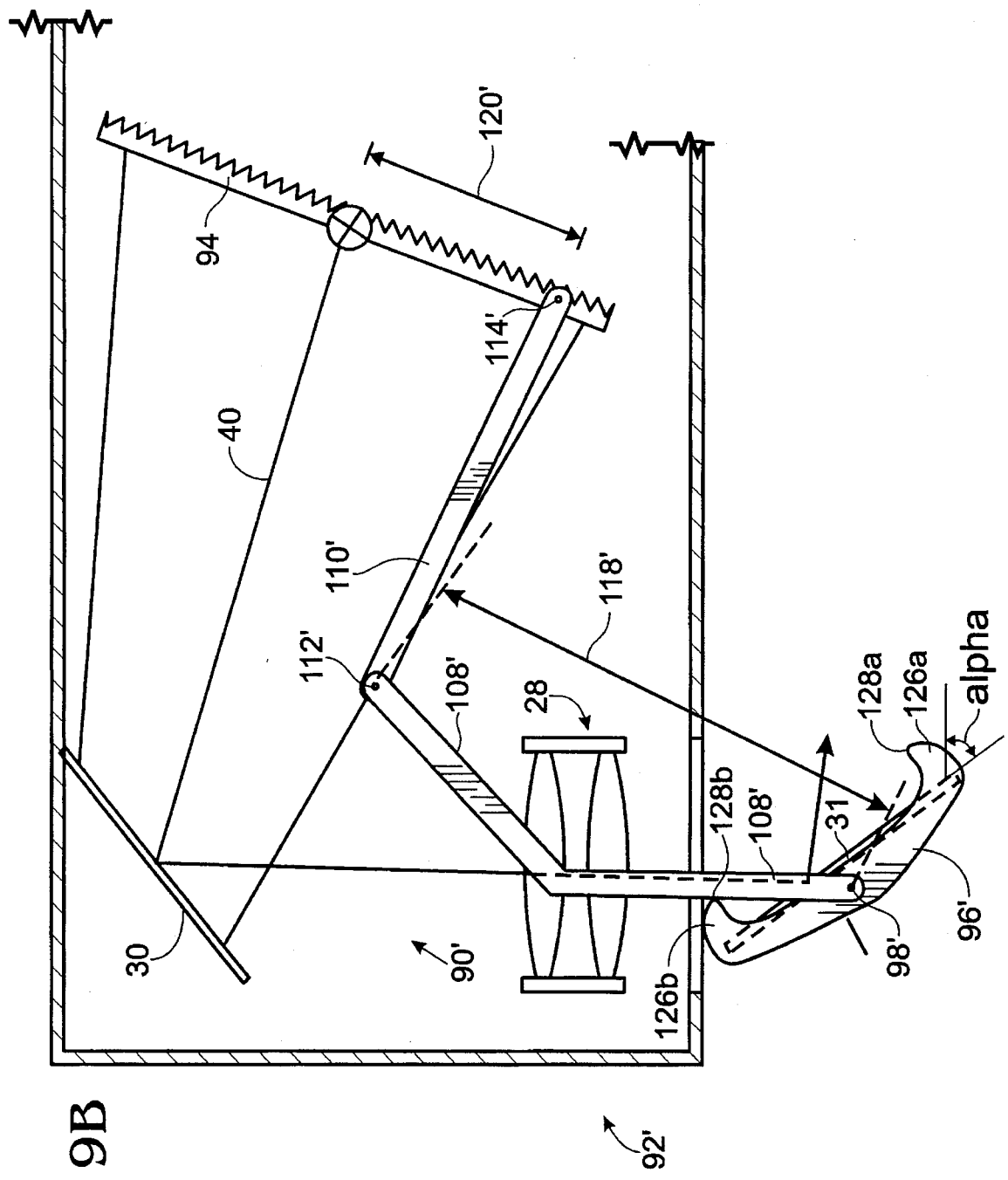

FIGS. 9A and 9B are diagrammatic side views of an automatic keystone distortion correction mechanism 90' employed in an LCD projector 92' with a folded optical path and optical components such as LCD projectors 10 and 92, except as indicated otherwise. Correction mechanism 90' causes a converging Fresnel field lens 94 to tilt relative to optical axis 40 in agreement with any adjustment of the elevation angle of LCD projector 92' with tiltable projection mirror 31. FIGS. 9A and 9B show automatic keystone distortion correction mechanism 90' with reference to a conventional table-mounted upwardly projecting arrangement and an inverted ceiling-mounted downwardly projecting arrangement, respectively.

Correction mechanism 90' operates in the same manner as correction mechanism 90, except as indicated otherwise. Mirror housing 96' includes a pair of arms or preferably ridges 126a and 126b with contact ends 128a and 128b. In the table-mounted upwardly projecting configuration of FIG. 9A, contact end 128a engages lever arm 108', which pivots in common with mirror housing 96' about pivot axis 98' at an upward preselected mirror tilt angle alpha (e.g., about 45 degrees). Push rod link 110' is linearly coupled with pivot links between an end 112' of lever arm 108' and a pivot coupling 114' on a side margin of a bracket (not shown) supporting Fresnel lens 94. Mechanism 90 automatically corrects keystone distortion for tilt angles greater than the preselected tilt angle alpha in substantially the same manner as correction mechanism 90.

In the ceiling-mounted downwardly projecting arrangement of FIG. 9B, contact end 128b engages lever arm 108' at a downward preselected tilt angle (e.g., about 45 degrees), which represents a minimum downward projection angle for which projector 92'. The downward preselected projection angle may be the same as or different from the upward preselected tilt angle. At tilt angles with larger absolute values, contact end 128b engages lever arm 108' and pivots it about pivot axis 98'. As a result, end 112' of lever arm 108' moves push rod link 110' and pivot coupling 114' in a direction 116b to tilt Fresnel lens 92' and automatically correct keystone distortion.

Figure 10A:
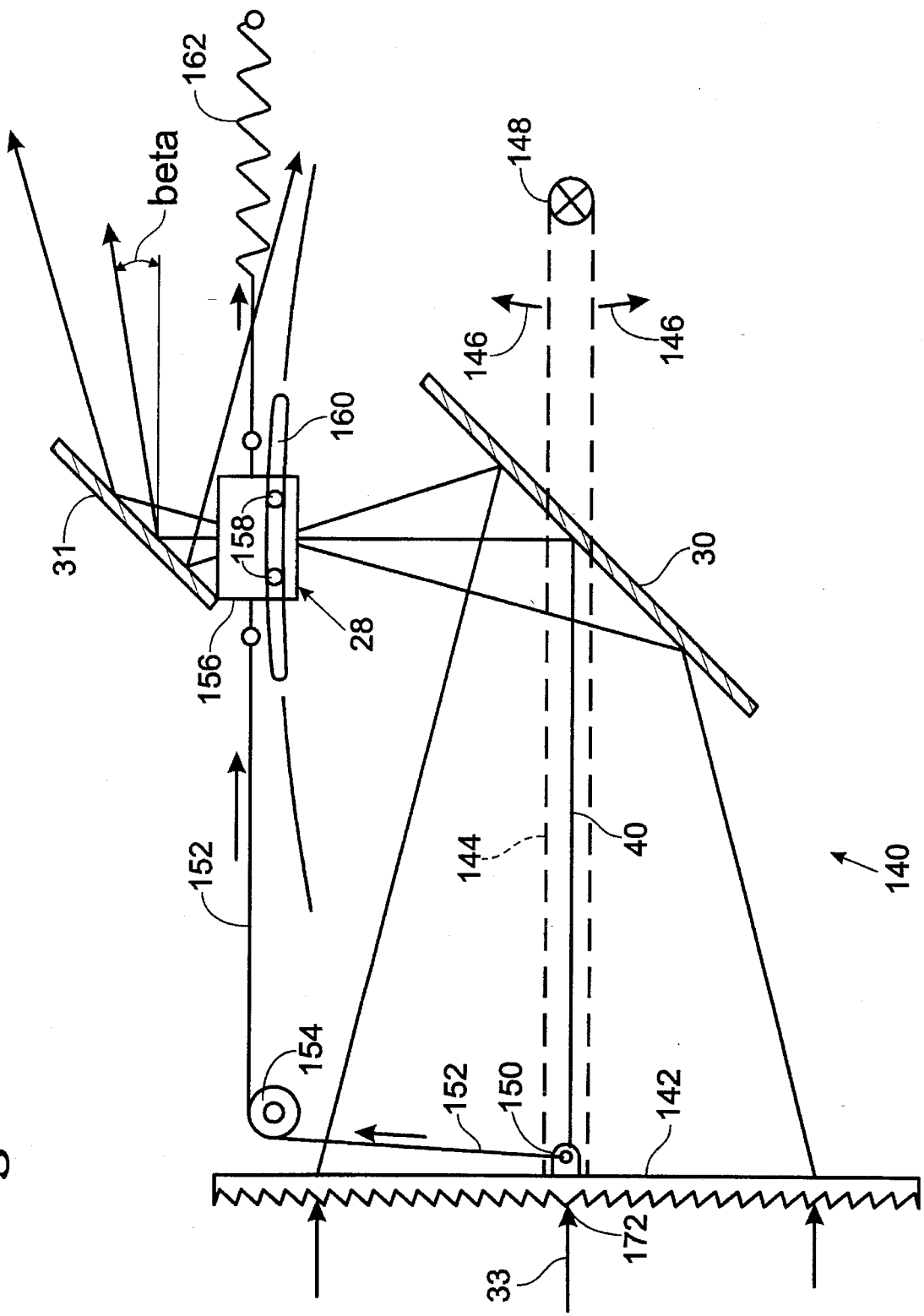
Figure 10B:
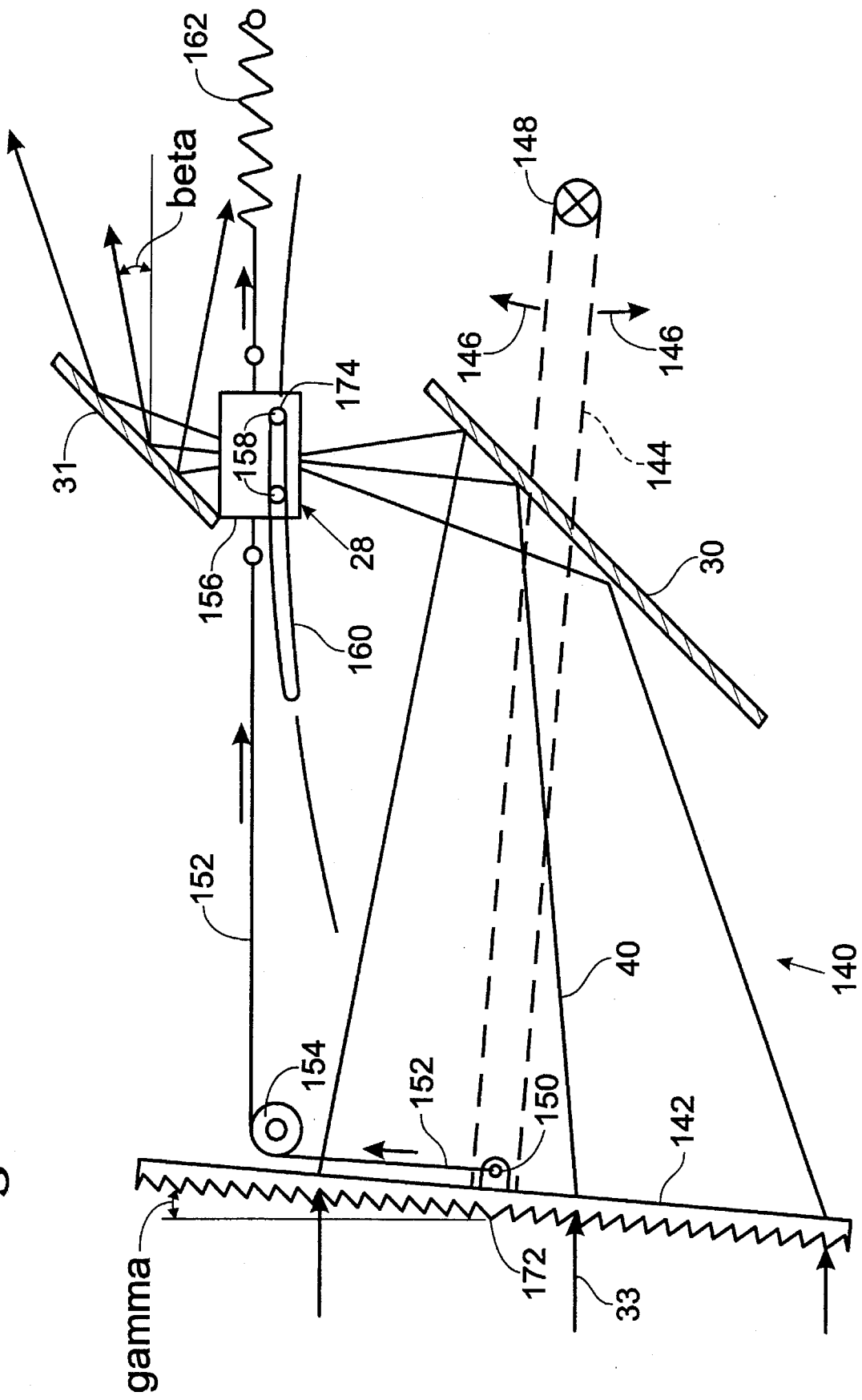

FIGS. 10A–10C are diagrammatic side views of another embodiment of an automatic keystone distortion correction mechanism 140 employed in an LCD projector (not shown) with a folded optical path and optical components, such as LCD projector 10 (FIGS. 1 and 2). Correction mechanism 140 causes a converging Fresnel field lens 142 to tilt and shift relative to optical axis 40 in agreement with any adjustment of the projection elevation angle of the LCD projector with tiltable projection mirror 31, thereby to provide enhanced correction of keystone distortion.

Automatic keystone distortion correction mechanism 140 is operable in a conventional table-mounted upwardly projecting arrangement and an inverted ceiling-mounted downwardly projecting arrangement. FIGS. 10A–10C show correction mechanism 140 in the conventional upwardly projecting arrangement for purposes of explanation.

Referring to FIG. 10A, a bracket (not shown) supporting Fresnel field lens 142 is secured to a pivot rod 144 (shown in outline) pivotable in directions 146 about a pivot axis 148. (For purposes of simplicity, the following description refers to Fresnel field lens 142 rather than the bracket supporting it.) Fresnel field lens 142 also includes a linkage bracket 150 to which a linkage 152 is secured. Linkage 152 preferably is a belt or a band that extends over a roller 154 to a carrier 156.

Projection lens assembly 28 and projection mirror 31 are carried by carrier 156, which includes opposed pairs of tracking rollers or pins 158 (only one of each pair shown) that extend from opposite sides of carrier 156. Tracking pins 158 travel, preferably slide, within a matched pair of tracks 160 (only one shown). A bias coil spring 162 coupled between carrier 156 and an anchor (e.g., a projector housing, not shown) counter balances Fresnel field lens 142. Projection mirror 31 directs light with display information toward a display screen (not shown) at an elevation angle beta that is adjustable with a user-actuated control knob (not shown) that is coupled to pivot rod 144 or roller 154 to shift and tilt Fresnel field lens 142. The shifting and tilting of Fresnel field lens 142 cooperate to provide the elevation angle beta and automatic keystone distortion correction with variations in the elevation angle.

With a preselected elevation angle beta (e.g., about 6 degrees), as shown in FIG. 10A, the user-actuated control knob cooperates with linkage 170 to position pivot rod 144 so that Fresnel field lens 142 is positioned with its optical center 172 generally aligned with initial optical axis 33. With a substantially perpendicular coupling to pivot rod 144, Fresnel field lens 142 also is substantially perpendicular to initial optical axis 33. The positioning of pivot rod 144 in this manner also causes carrier 156 to be positioned substantially in the middle of tracks 160 to position projection lens assembly 28 and projection mirror 31 in alignment with light imaged by Fresnel field lens 142.

With an elevation angle beta greater than the preselected elevation angle, as shown in FIG. 10B, the user-actuated control knob cooperates with linkage 170 to position pivot rod 144 so that Fresnel field lens 142 is positioned with its optical center 172 shifted or translated above initial optical axis 33. With a substantially perpendicular coupling to pivot rod 144, Fresnel field lens 142 also is tilted at a positive tilt angle gamma relative to initial optical axis 33. The positioning of pivot rod 144 in this manner also causes carrier 156 to travel toward a forward end 174 of tracks 160 to position projection lens assembly 28 and projection mirror 31 in alignment with light imaged by Fresnel field lens 142. Preferably, tracks 160 are slightly arcuate to tilt slightly projections lens assembly 28 in correspondence with the tilt of Fresnel field lens 142 to provide uniform focus at the tops and bottoms of images formed at the display screen.

With an elevation angle beta less than the preselected elevation angle, as shown in FIG. 10C, the user-actuated control knob cooperates with linkage 170 to position pivot rod 144 so that Fresnel field lens 142 is positioned with its optical center 172 shifted or translated below initial optical axis 33. With a substantially perpendicular coupling to pivot rod 144, Fresnel field lens 142 also is tilted at a negative tilt angle gamma relative to initial optical axis 33. The positioning of pivot rod 144 in this manner also causes carrier 156 to travel toward a rearward end 176 of tracks 160 to position projection lens assembly 28 and projection mirror 31 in alignment with light imaged by Fresnel field lens 142. Preferably, tracks 160 are slightly arcuate to tilt slightly projection lens assembly 28 in correspondence with the tilt of Fresnel field lens 142 to provide uniform focus at the tops and bottoms of images formed at the display screen.

The combined variable shift and tilt of Fresnel field lens 142 provide combined elevation angle selection and automatic correction of keystone distortion in accordance with the present invention. While either shifting or tilting alone provide some elevation angle selection or correction of keystone distortion, the combination provides a greater range of elevation angles at which display images may be projected without keystone distortion.

Having illustrated and described the principles of the present invention in a preferred embodiment, it should be apparent to those skilled in the art that the embodiment can be modified in arrangement and detail without departing from such principles. For example, the preferred embodiments of projectors incorporating this invention are described as LCD projectors with LCDs that modulate light to impart display information. It will be appreciated, however, that this invention is applicable generally to electro-optic projectors that employ electro-optic light modulating elements other than LCDs. Accordingly, we claim as our invention all such embodiments as come within the scope and spirit of the following claims and equivalents thereto.

We claim:

1. In a LCD projector having a light source that illuminates a LCD having an optical center substantially aligned with an illumination optical axis extending from the light source, the LCD panel providing display information that is projected toward a display screen to form a display image, the display image being projected at an elevation angle in an elevation direction toward the display screen, the improvement comprising:

a field lens positioned to receive the display information from the LCD panel and form a display object corresponding to the display image, the field lens having an optical center offset from the optical center of the LCD panel in the elevation direction to define a projection optical axis that extends toward the display screen, the field lens being tilted about a tilt axis transverse to the projection optical axis and the elevation direction to cooperate with the offset of the field lens optical center to form an orthoscopic display image.

2. The LCD projector of claim 1 further comprising:

a field lens tilt mechanism for tilting the field lens about the tilt axis with variations in the elevation angle of the LCD projector, thereby to provide orthoscopic display images over a range of LCD projector elevation angles.

3. The LCD projector of claim 2 further comprising:

a tiltable projection mirror that receives the display image from a projection lens and directs the display image toward the display screen along the elevation angle, the field lens tilt mechanism coupling the projection mirror and the field lens so that they tilt together.

4. The LCD projector of claim 1 further comprising:

a tiltable projection mirror that receives the display image from a projection lens and directs the display image toward the display screen along the elevation angle and projection mirror mounting brackets for selectively mounting the projection mirror in first and second orientations to direct the display image in generally opposed directions relative to the projection lens, whereby the projection mirror mounted in the first and second orientations cooperates with positioning the LCD projector in first and second vertical orientations to provide upward and downward projection of orthoscopic display images, respectively.

5. In a LCD projector having a light source that illuminates a LCD, the LCD panel providing display information that is projected toward a display screen to form a display image, the display image being projected at an elevation angle in an elevation direction toward the display screen, the improvement comprising:

a field lens positioned to receive the display information from the LCD panel and form a display object corresponding to the display image; and a field lens tilt assembly for tilting the field lens about a tilt axis transverse to the projection optical axis and the elevation direction with variations in the elevation angle of the LCD projector to form an orthoscopic display image over a range of LCD projector elevation angles.

6. The LCD projector of claim 5 further comprising:

a tiltable projection mirror that receives the display image from a projection lens and directs the display image toward the display screen along the elevation angle, the lens tilt mechanism coupling the projection mirror and the lens so that they tilt together.

7. The LCD projector of claim 5 further comprising:

a tiltable projection mirror that receives the display image from a projection lens and directs the display image toward the display screen along the elevation angle and projection mirror mounting brackets for selectively mounting the projection mirror in first and second orientations to direct the display image in generally opposed directions relative to the projection lens, whereby the projection mirror mounted in the first and second orientations cooperates with positioning the LCD projector in first and second vertical orientations to provide upward and downward projection of orthoscopic display images, respectively.

8. The LCD projector of claim 5 in which the lens includes a Fresnel lens.

9. The LCD projector of claim 8 in which the LCD has an optical center substantially aligned with an illumination optical axis extending from the light source and the Fresnel lens has an optical center offset from the optical center of the LCD in the elevation direction to define a projection optical axis that extends toward the display screen.

10. In a LCD projector having a light source that illuminates a LCD panel providing display information that is projected toward a display screen to form a display image, the display image being projected at an elevation angle by a projection mirror toward the display screen, the improvement comprising:

a projection lens assembly positioned and oriented to receive the display image and direct it along a generally vertical axis toward the projection mirror; and a projection mirror mounting assembly that selectively provides the projection mirror with first and second orientations to direct the display image in opposed first and second directions transverse to the generally vertical axis, whereby the projection mirror mounted in the first and second orientations cooperates with positioning the LCD projector in respective first and second vertical orientations to provide upward and downward projection of display images.

11. The LCD projector of claim 10 in which the projection mirror mounting assembly selectively provides the projection mirror with first and second ranges of orientations that direct the display image toward the display screen at corresponding ranges of elevation angles.

12. The LCD projector of claim 10 further comprising:

a field lens positioned to receive the display information from the LCD panel and form a display object corresponding to the display image and propagating along an optical axis toward the projection lens assembly; and a field lens tilt assembly for tilting the field lens about a tilt axis transverse to the optical axis in cooperation with the elevation angle of the LCD projector to form orthoscopic display images with the LCD projector positioned in either of the first and second vertical orientations to provide upward and downward projection of display images.

13. The LCD projector of claim 12 in which the field lens includes a Fresnel lens.

14. The LCD projector of claim 1 in which the field lens includes a Fresnel lens.

* * * * *